US012717285B2

(12) United States Patent
Lindell et al.

(10) Patent No.: US 12,717,285 B2
(45) Date of Patent: Aug. 25, 2026

(54) METHOD OF PERFORMING CIRCUIT OPENING AND CLOSING OPERATION, COMPUTER PROGRAM, CONTROL SYSTEM AND POWER SYSTEM

(71) Applicant: ABB Schweiz AG, Baden (CH)

(72) Inventors: Elisabeth Lindell, Västerås (SE); Stefan Halen, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 344 days.

(21) Appl. No.: 18/588,555

(22) Filed: Feb. 27, 2024

(65) Prior Publication Data

US 2024/0329606 A1 Oct. 3, 2024

(30) Foreign Application Priority Data

Mar. 28, 2023 (EP) .................................... 23164523

(51) Int. Cl.
*H02H 3/00* (2006.01)
*G05B 11/36* (2006.01)

(52) U.S. Cl.
CPC .................................... *G05B 11/36* (2013.01)

(58) Field of Classification Search
CPC ...................................................... G05H 11/36
See application file for complete search history.

(56) References Cited

U.S. PATENT DOCUMENTS 5,563,459 A 10/1996 Kurosawa et al.
5,644,463 A * 7/1997 El-Sharkawi ............ H01H 9/56 361/7
10,126,150 B2 * 11/2018 Piippo .................. G01D 5/2013
10,622,170 B2 4/2020 Lindell et al.
2010/0039737 A1 2/2010 Koshizuka et al.
2019/0044460 A1 2/2019 Jaap et al.
2019/0371542 A1 12/2019 Lindell et al.
2020/0328039 A1 * 10/2020 Backman ................ H01H 9/56
2024/0331958 A1 * 10/2024 Lindell .................... H01H 9/56

FOREIGN PATENT DOCUMENTS

EP 3716431 A1 9/2020

OTHER PUBLICATIONS

Extended European Search Report; Application No. 23164523.5; Completed Aug. 24, 2023; Mailing Date: Sep. 1, 2023; 6 Pages.

* cited by examiner

*Primary Examiner* — Stephen W Jackson
(74) *Attorney, Agent, or Firm* — Greenberg Traurig, LLP

(57) ABSTRACT

A method of performing a circuit opening and closing operation in a power system having a first phase, a second phase), and a third phase, the method including a) opening only a reference phase among the first phase, the second phase and the third phase such that a reference current of the reference phase is interrupted at a first current zero crossing after the opening; b) opening the remaining phases after step a); c) closing only the reference phase and a phase lagging the reference phase by 120° simultaneously or essentially simultaneously at a closing phase angle of a phase to ground voltage of the reference phase of 320°±70° when the current zero crossing is a positive current zero crossing, or of 140°±70° when the current zero crossing is a negative current zero crossing; and d) closing the phase lagging the reference phase by 240° after step c).

20 Claims, 5 Drawing Sheets

METHOD OF PERFORMING CIRCUIT OPENING AND CLOSING OPERATION, COMPUTER PROGRAM, CONTROL SYSTEM AND POWER SYSTEM

TECHNICAL FIELD

The present disclosure generally relates to circuit opening and closing operations. In particular, a method of performing a circuit opening and closing operation, a computer program, a control system for controlling a circuit breaker system connected to a three-phase power source, and a power system, are provided.

BACKGROUND

Circuit breakers may in certain applications be subjected to a great plurality of circuit opening and closing operations. In for example electric arc furnace applications, the circuit breakers might wear out quickly due to being operated extremely frequently, such as around 100 times per day.

Traditionally, circuit breakers used for operating electric arc furnaces are not synchronized. In such non-synchronized circuit breakers, the circuit opening and closing operations are not synchronized with respect to the phase angle of the voltages (or currents) in the grid. This may lead to severe contact wear, especially considering that electric arc furnace circuit breakers are operated so frequently. It may also lead to transient stresses in the system; both in terms of reignitions at opening of the circuit breaker and inrush currents to the electric arc furnace transformer at closing.

EP 3716431 A1, the content of which is incorporated herein by reference in its entirety, discloses a method of performing a circuit-breaking and closing operation in a three-phase system having a first phase, a second phase lagging the first phase by 120°, and a third phase lagging the first phase by 240°, wherein the method comprises:

a) opening only one of the first phase, the second phase and the third phase before a current zero crossing of a current of the corresponding phase, b) opening the remaining phases of the first phase, the second phase and the third phase after step a), and c) closing the first phase, the second phase and the third phase simultaneously or essentially simultaneously at a phase to ground voltage of the phase of the first phase, the second phase and the third phase which is lagging the phase that was opened in step a) by 120° in a time range from 60° before a peak of said phase to 90° after the peak.

The method in EP 3716431 A1 prolongs the life of a circuit breaker, substantially reduces or eliminates transient overvoltages due to reignitions, and generally keeps inrush currents below a nominal current.

SUMMARY

One object of the invention is to provide an improved method of performing a circuit opening and closing operation in a power system.

A further object of the invention is to provide an improved computer program.

A still further object of the invention is to provide an improved control system for controlling a circuit breaker system connected to a three-phase power source.

A still further object of the invention is to provide an improved power system.

These objects are achieved by the method according to appended claim 1, the computer program according to appended claim 10, the control system according to appended claim 11, and the power system according to appended claim 12.

The invention is based on the realization that by using a "1+2 opening sequence" in combination with a "2+1 closing sequence" of phases in a three-phase power system as described herein, a window of closing phase angles providing a nominally low inrush current, can become much wider in comparison with a "1+2 opening sequence" in combination with a simultaneous closing of all phases.

According to a first aspect, there is provided a method of performing a circuit opening and closing operation in a power system having a first phase, a second phase lagging the first phase by 120°, and a third phase lagging the first phase by 240°, the method comprising:

a) opening only a reference phase among the first phase, the second phase and the third phase such that a reference current of the reference phase is interrupted at a first current zero crossing after the opening;

b) opening the remaining phases of the first phase, the second phase and the third phase after step a);

c) closing only the reference phase and a phase among the first phase, the second phase and the third phase lagging the reference phase by 120° simultaneously or essentially simultaneously at a closing phase angle of a phase to ground voltage of the reference phase of 320°±70° when the current zero crossing is a positive current zero crossing, or of 140°±70° when the current zero crossing is a negative current zero crossing; and d) closing the phase lagging the reference phase by 240° after step c).

The method of the first aspect provides an improved synchronization strategy for circuit opening and closing operations. In contrast to EP 3716431 A1, the method of the first aspects utilizes single-pole operation at both opening and closing. In this way, a wider range of closing phase angles that generate inrush currents below a nominal value can be used for the closing in step c). The requirement on precision of the closing phase angle is eased, which implies that larger variations in parameters such as power factor of the load and layout of the grid can be handled, using the same synchronization strategy. The method therefore provides increased possibilities for minimizing inrush currents to a downstream load. Precision requirements on the power system, such on a circuit breaker system thereof, can therefore be relaxed.

With the method of the first aspect, the timing of the opening and closing of the phases can be determined only based on readings from a single sensor providing a signal indicative of a phase to ground voltage of one of the phases, such as a voltage sensor sensing a phase to ground voltage of one of the phases. To be able to use only one such sensor, an assumption about symmetry between the phases can be made.

In step a) the opening of the reference phase may be performed such that the reference current is interrupted at the first current zero crossing of the reference current after the opening of the reference phase without causing reignitions. The opening of the reference phase may for example be performed less than a half period before the current zero crossing. Alternatively, or in addition, the opening of the reference phase may for example be performed at least 20° before the current zero crossing and/or at least 1 ms before the current zero crossing.

In step c) 0° of the closing phase angle of the phase to ground voltage of the reference phase is at a positive voltage zero crossing of the phase to ground voltage of the reference phase.

At a positive current zero crossing, the current has a positive derivative. Conversely, at a negative current zero crossing, the current has a negative derivative. At a positive voltage zero crossing, the voltage has a positive derivative. Conversely, at a negative voltage zero crossing, the voltage has a negative derivative.

With the term "essentially" hereabove is meant within a time range of the order of one or more tenths of a millisecond.

With the term "opening" is herein meant achieving contact separation. What is controlled by the opening is achieving contact separation. By the term "closing" is herein meant achieving contact touch. What is controlled by the closing is achieving contact touch. In order to open and close a phase, a pole or a pair of contacts associated with the phase may be opened and closed, respectively.

In step c) the closing phase angle may be 320°±40° when the current zero crossing is a positive current zero crossing, or 140°±40° when the current zero crossing is a negative current zero crossing.

In step c) the closing phase angle may be 320°±20°, such as 320°±10°, such as 320°±5°, when the current zero crossing is a positive current zero crossing, or 140°±20°, such as 140°±10°, such as 140°±5°, when the current zero crossing is a negative current zero crossing.

In step b) the remaining phases may be opened simultaneously or essentially simultaneously.

In step b) the remaining phases may be opened in a time range from 60° to 120°, such as a quarter period, after the opening of the reference phase in step a).

In step d) the phase lagging the reference phase by 240° may be closed in a time range from 60° to 120°, such as a quarter period, after step c).

The method may comprise selecting the reference phase opened in step a) such that the first phase, the second phase and the third phase are opened first equally or about equally often over 100, 500 or 1000 circuit opening operations. By opening different phases in step a) for different circuit opening and closing operations in a manner such that statistically, in a large number of circuit opening and closing operations, each phase has been opened about an equal number of times first in step a), the wear of the pole of a particular phase of the circuit breaker system may be reduced as the wear is spread evenly between all three poles.

According to a second aspect, there is provided a computer program comprising computer code which when executed by processing circuitry of a control system causes the control system to command performance of the method according to the first aspect.

According to a third aspect, there is provided a control system for controlling a circuit breaker system connected to a three-phase power source having a first phase, a second phase lagging the first phase by 120°, and a third phase lagging the first phase by 240°, wherein the control system comprises processing circuitry; and a storage medium comprising computer code which when executed by the processing circuitry causes the control system to perform the method according to the first aspect.

The circuit breaker system may be a circuit breaker, such as a vacuum circuit breaker.

According to a fourth aspect, there is provided a power system comprising a control system according to the third aspect; a circuit breaker system having a first pole, a second pole and a third pole; and three actuating devices, each actuating device being configured to actuate a respective one of the first pole, the second pole and the third pole; wherein the control system is configured to control the actuating devices. The actuating devices may for example be motors, servomotors, spring actuators or magnetic actuators.

The power system may be an electric arc furnace circuit breaker system. Alternatively, or in addition, a load may be arranged downstream of the power system. The load may be inductive or partially inductive. The load may comprise a transformer. The transformer may comprise Y-connected primary windings with ungrounded neutral, or delta connected primary windings. In any case, the power system can thus efficiently suppress inrush currents to the transformer. In the electric arc furnace circuit breaker system, the load to the transformer may be an electric arc furnace. That is, the electric arc furnace may be connected to a low voltage side of the transformer.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
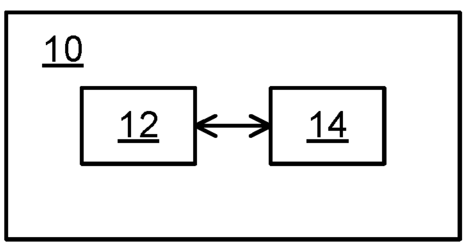
FIG. 1: is a schematic block diagram of a control system.

In the following, a method of performing a circuit opening and closing operation, a computer program, a control system for controlling a circuit breaker system connected to a three-phase power source, and a power system, will be described. The same or similar reference numerals will be used to denote the same or similar structural features.

FIG. 1 is a schematic block diagram of a control system 10 according to one example. The control system 10 is configured to control performance of a circuit opening and closing operation. The control system 10 comprises processing circuitry 12 and a storage medium 14.

The processing circuitry 12 may for example use any combination of one or more of a suitable central processing unit (CPU), multiprocessor, microcontroller, digital signal processor (DSP), application specific integrated circuit (ASIC), field programmable gate arrays (FPGA) etc., capable of executing any herein disclosed circuit opening and closing operations.

The storage medium 14 may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. A computer program according to the invention is stored in the storage medium 14.

Figure 2:
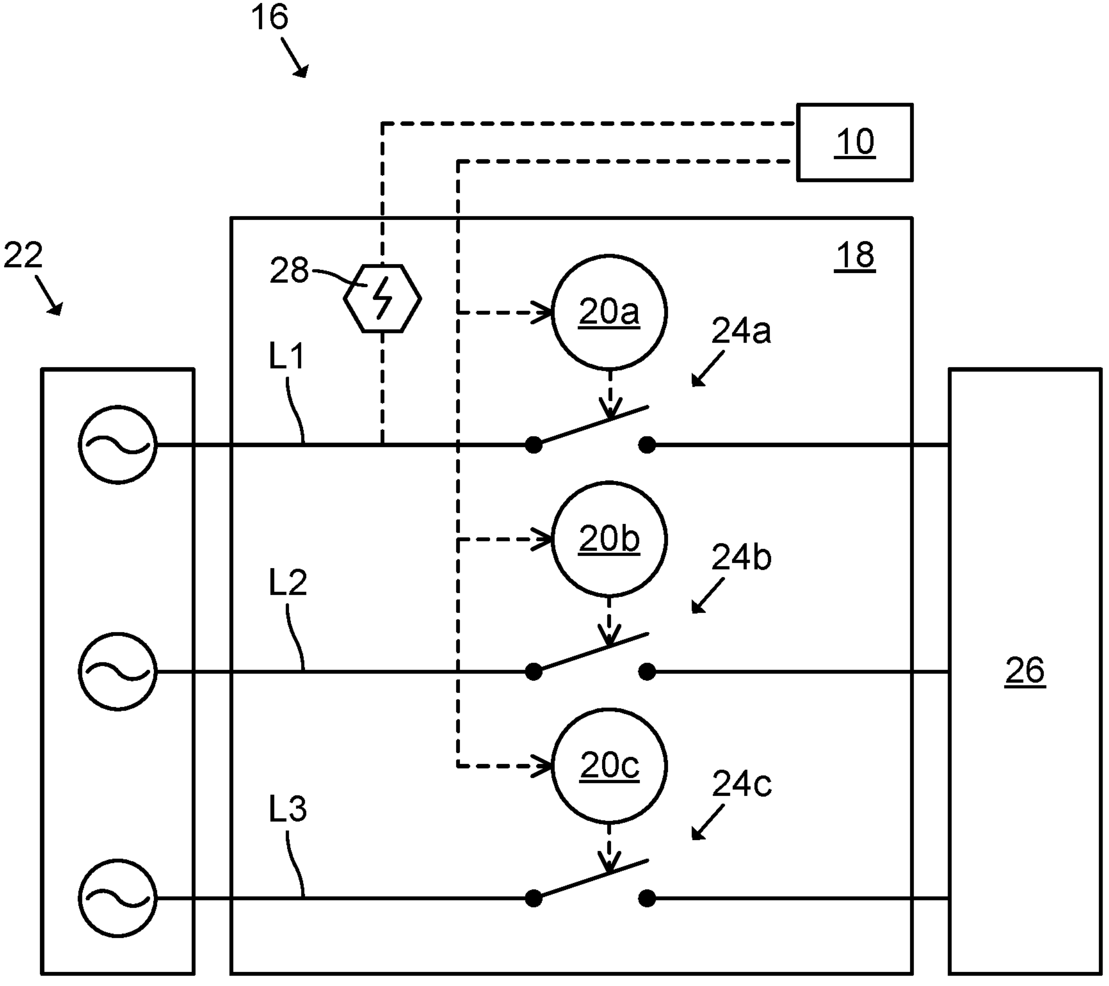
FIG. 2: schematically represents a power system.

FIG. 2 schematically represents an alternating current, AC, power system 16. The power system 16 comprises the control system 10 and a circuit breaker system 18, here exemplified as a vacuum circuit breaker system. The circuit breaker system 18 comprises three actuating devices, in the following exemplified by servomotors 20*a*-20*c*. FIG. 2 further shows a power source 22 providing three electrical phases: a first phase L1, a second phase L2 and a third phase L3. In this example, the second phase L2 lags the first phase L1 by 120° and the third phase L3 lags the second phase L2 by 120°. The phase sequence of this example is thus a positive phase sequence.

The exemplified circuit breaker system 18 is a three-phase circuit breaker system. The circuit breaker system 18 hence has three pairs of contacts or poles 24*a*-24*c*. More specifically, the circuit breaker system 18 comprises three poles 24*a*-24*c*, one for each phase L1-L3, with one contact gap in each pole 24*a*-24*c*. Each pole 24*a*-24*c* may for example comprise a movable contact and a fixed contact. Each of the first pole 24*a*, the second pole 24*b* and the third pole 24*c* is is configured to be connected to the first phase L1, the second phase L2 and the third phase L3, respectively. The circuit breaker system 18 is configured to break partly or purely inductive loads. In an example where the circuit breaker system 18 is for electric arc furnace applications, one of the contacts of each pole 24*a*-24*c* may also be connected to e.g., the electrodes of an electric arc furnace, typically via a transformer 26. A series reactor may also be arranged between the circuit breaker system 18 and the transformer 26. The transformer 26 may be equipped with overvoltage protection devices, such as resistor-capacitor (RC) snubbers or surge arresters. In FIG. 2, the power source 22 is arranged upstream of the circuit breaker system 18 and the transformer 26 is arranged downstream of the circuit breaker system 18. The power source 22 may be an upstream grid or an upstream power supply system. The power source 22 may provide medium voltage to the power system 16. Primary windings and secondary windings of the transformer 26 may operate at medium voltage and low voltage, respectively.

Alternatively, the circuit breaker system 18 could comprise three single-phase circuit breakers, three single-phase switches or a three-phase switch, three single-phase contactors or a three-phase contactor, or three single-phase load break switches or a three-phase load break switch.

The control system 10 is configured to control the servomotors 20*a*-20*c*. Each servomotor 20*a*-20*c* is configured to operate a respective one of the movable contacts of the poles 24*a*-24*c*, between an open position and a closed position based on control signals received from the control system 10. Each pole 24*a*-24*c* is thus controlled by a unique servomotor 20*a*-20*c*.

The power system 16 of this example further comprises a voltage sensor 28, here arranged upstream of the first pole 24*a*. The voltage sensor 28 senses a phase to ground voltage of one of the phases, here the first phase L1, and outputs a corresponding voltage signal to the control system 10. Based on the voltage signal, the control system 10 is configured to determine when to open and close the phases L1-L3, and when to send corresponding control signals to the servomotors 20*a*-20*c*. In order to do this, it can be assumed that there is a symmetrical phase shift of the other two phases with respect to the phase for which the phase to ground voltage has been sensed. The control system 10 is thus arranged to provide data relating to the voltages in the phases L1-L3 on the grid side of the circuit breaker system 18 and to send control signals to the servomotors 20*a*-20*c* based on this data.

Figure 3:
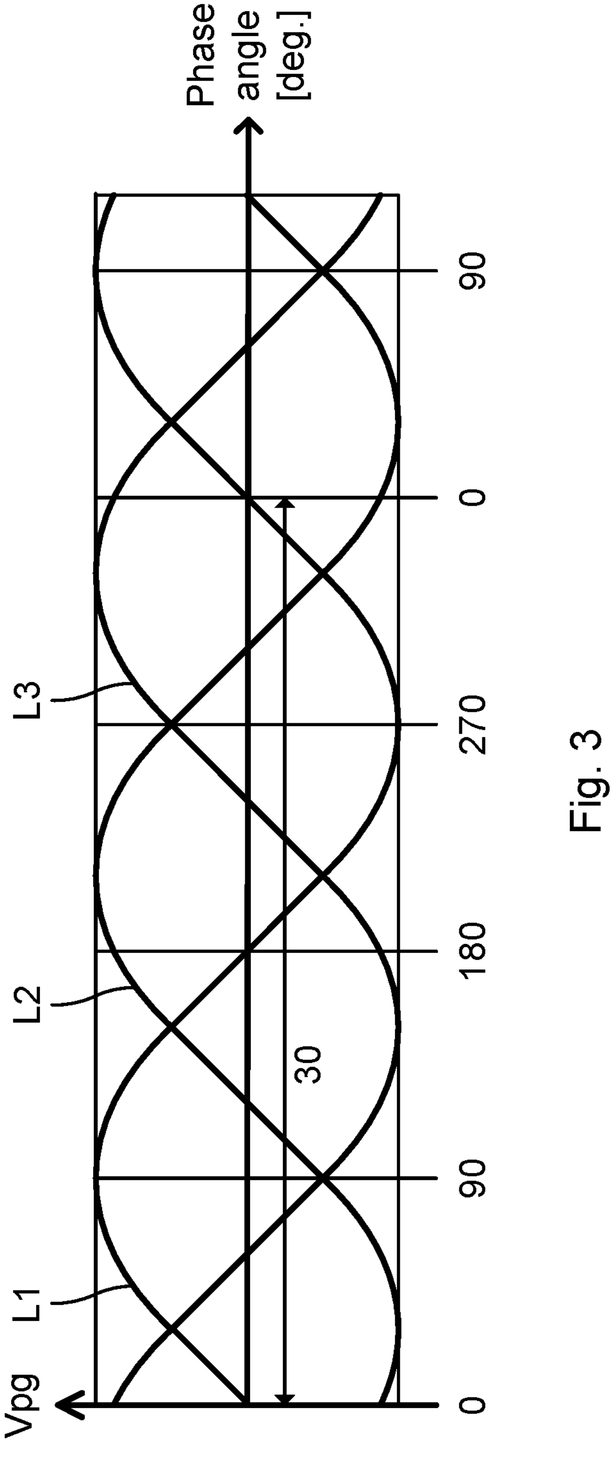
FIG. 3: is a graph of phase to ground voltage of three phases.

FIG. 3 is a graph of the phase to ground voltage Vpg of the three phases L1-L3. FIG. 3 further shows a duration of a period 30.

Figure 4:
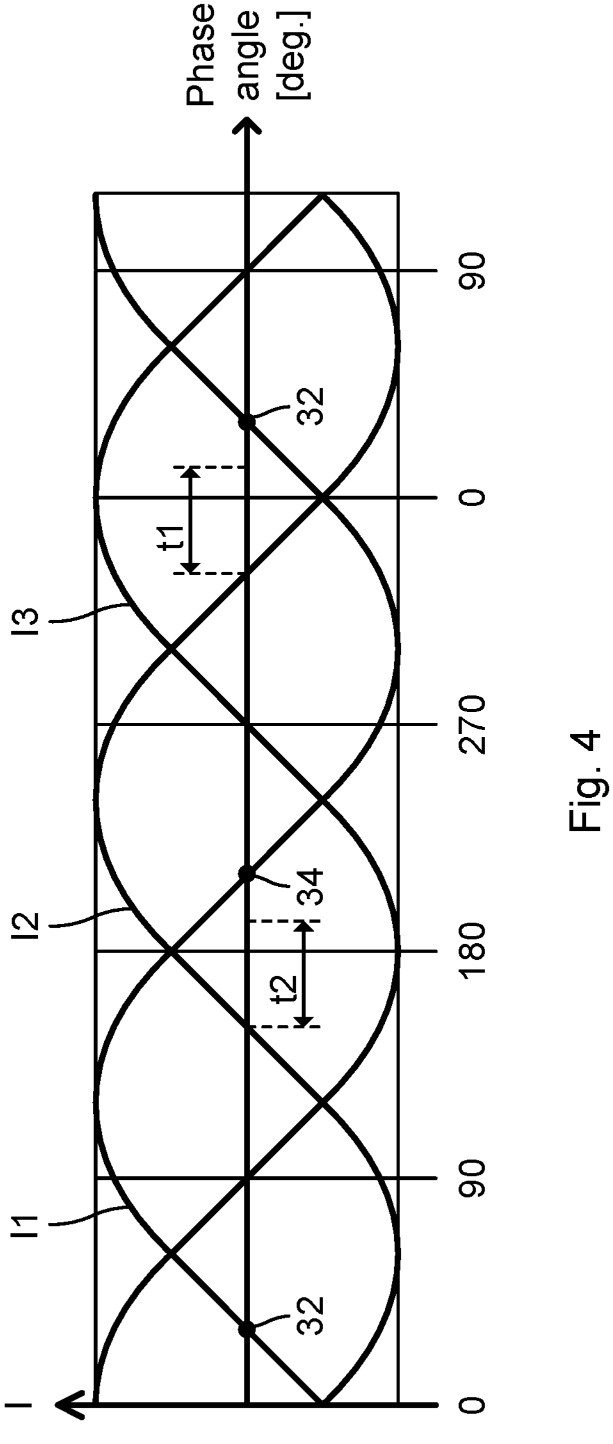
FIG. 4: is a graph of currents of the three phases.

FIG. 4 is a graph of currents I of the three phases L1-L3, namely a first current I1 of the first phase L1, a second current I2 of the second phase L2, and a third current I3 of the third phase L3. FIG. 4 shows two positive current zero crossings 32 and one negative current zero crossing 34 of the first current I1.

In order to open a phase such that the current of the phase is interrupted at a first current zero crossing 32, 34 after the opening, the phase may be opened before the respective current zero crossing 32, 34. The terms "before a current zero crossing" typically means a time range of less than a half period 30 before the current zero crossing 32, 34 and at least 1 ms before the current zero crossing 32, 34. FIG. 4 shows schematic examples of such time periods, namely a first time period t1 and a second time period t2.

The first time period t1 is 60° to 20° before the positive current zero crossing 32, i.e., from 3.33 ms to 1.11 ms before the positive current zero crossing 32 at 50 Hz. The second time period t2 is 60° to 20° before the negative current zero crossing 34. For example, in order to open the first phase L1 first such that the first current I1 is interrupted at a first positive current zero crossing 32 after the opening without reignition, the first phase L1 may be opened in the first time period t1. Conversely, in order to open the first phase L1 such that the first current I1 is interrupted at a first negative current zero crossing 34 after the opening without reignition, the first phase L1 may be opened in the second time period t2.

Figure 5:
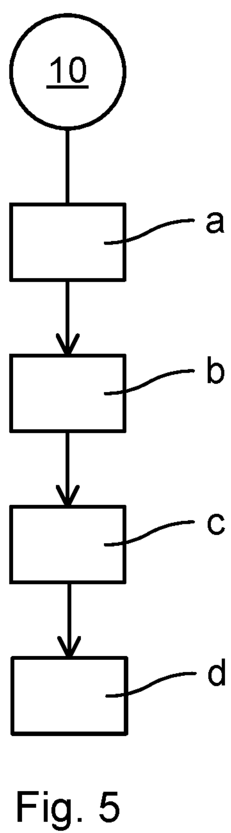
FIG. 5: is a flowchart outlining general steps of a method.

FIG. 5 is a flowchart outlining general steps of a method of performing a circuit opening and closing operation in the power system 16 according to the invention.

In a step a) a reference phase among the first phase L1, the second phase L2 and the third phase L3 is opened such that a reference current of the reference phase is interrupted at a first current zero crossing 32, 34 after the opening. Hereto, the control system 10 is configured to provide a control signal to one of the servomotors 20*a*-20*c* to open the corresponding pole 24*a*-24*c*. For example, if the first phase L1 is opened in step a), the first phase L1 becomes the reference phase and the reference current becomes the first current I1. The current zero crossing may be either a positive current zero crossing 32 or a negative current zero crossing 34. 0° of the phase to ground voltage Vpg of the reference phase is at a positive voltage zero crossing of the phase to ground voltage Vpg of the reference phase.

The control system 10 may be configured to monitor the voltage, such as by the voltage sensor 28, in at least one of the first phase L1, the second phase L2, and the third phase L3 in order to be able to determine when a current zero crossing 32, 34 of a particular phase is going to occur. Step a) may be performed based on a determination of the current in at least one of the phases L1-L3.

In a step b) the other two phases which were not opened in step a) are opened. These phases are preferably opened a quarter of a period or 90° after the opening of the reference current in step a). These two phases may be opened simultaneously in step b). The control system 10 may hence provide control signals to the remaining two servomotors 20*a*-20*c* to open the remaining closed poles 24*a*-24*c*. Steps a) and b) thus form a "1+2 opening sequence".

In a step c) only the reference phase and a phase lagging the reference phase by 120° are closed simultaneously or essentially simultaneously. For example, in case the first phase L1 is the reference phase opened first in step a), the first phase L1 and the second phase L2 are closed simultaneously or essentially simultaneously in step c) for a positive phase sequence. In case the reference current was interrupted at a positive current zero crossing 32 in step a), the two phases closed in step c) are closed simultaneously or essentially simultaneously at a closing phase angle of a phase to ground voltage Vpg of the reference phase of 320°±70°. In case the reference current was interrupted at a negative current zero crossing 34 in step a), the two phases closed in step c) are closed simultaneously or essentially simultaneously at a closing phase angle of a phase to ground voltage Vpg of the reference phase of 140°±70°. The control system 10 may hence provide control signals to the two servomotors 20*a*-20*c* associated with the two phases to be closed in step c).

Thus, if in step a) the first phase L1 is opened, then the applicable phase to ground voltage Vpg that is to be taken into account in step c) is that of the first phase L1. If in step a) the second phase L2 is opened, then the applicable phase to ground voltage Vpg that is to be taken into account in step c) is that of the second phase L2. If in step a) the third phase L3 is opened, then the applicable phase to ground voltage Vpg that is to be taken into account in step c) is that of the third phase L3.

In a step d) the phase lagging the reference phase by 240° is closed. The phase closed in step d) is preferably closed a quarter of a period or 90° after the closing of the two phases in step c). The control system 10 may hence be provided to send control signals to the servomotor 20*a*-20*c* associated with the phase to be closed in step d). For example, if in step a) the first phase L1 is the reference phase and if the phase sequence is positive, the first phase L1 and the second phase L2 are closed in step c) and the third phase L3 is closed in step d). Steps c) and d) thus form a "2+1 closing sequence". The control system 10 may be configured to obtain a voltage of at least one of the phases L1-L3, such as from the voltage sensor 28, in order to determine when to perform the closing of two of the servomotors 20*a*-20*c* in step c) and when to perform the closing of the remaining servomotor 20*a*-20*c* in step d).

It should be noted that a circuit opening and closing operation must not necessarily be performed within a short amount of time, e.g., within seconds. There may sometimes elapse minutes, hours or even days from the circuit opening operation to the circuit closing operation.

According to one example, the closing window of the reference phase in step c) is more narrow, such as 320°±40° for a positive current zero crossing 32 and 140°±40° for a negative current zero crossing, such as 320°±20° for a positive current zero crossing 32 and 140°±20° for a negative current zero crossing.

According to one example, the phase L1-L3 opened in step a) may be varied for different circuit opening and closing operations. The control system 10 may hence select which of the phases L1-L3 to open first in step a) of a circuit opening and closing operation. The equipment connected to each phase L1-L3 will thereby be exposed to a more even stress over time.

The method thus comprises a non-simultaneous or "2+1 closing sequence" of the phases L1-L3. Table 1 shows the respective phases L1-L3 opened or closed in each step of the method for a positive phase sequence and a negative phase sequence. In a positive phase sequence, the second phase L2 lags the first phase L1 by 120° and the third phase L3 lags the first phase L1 by 240°. In a negative phase sequence, the third phase L3 lags the first phase L1 by 120° and the second phase L2 lags the first phase L1 by 240°.

TABLE 1

| Phase sequence | Reference phase opened in step a) | Remaining phases opened in step b) | Phases closed in step c) | Phase closed in step d) |
|---|---|---|---|---|
| Positive | L1 | L2, L3 | L1, L2 | L3 |
| Positive | L2 | L3, L1 | L2, L3 | L1 |
| Positive | L3 | L1, L2 | L3, L1 | L2 |
| Negative | L1 | L3, L2 | L1, L3 | L2 |
| Negative | L2 | L1, L3 | L2, L1 | L3 |
| Negative | L3 | L2, L1 | L3, L2 | L1 |

Figure 6:
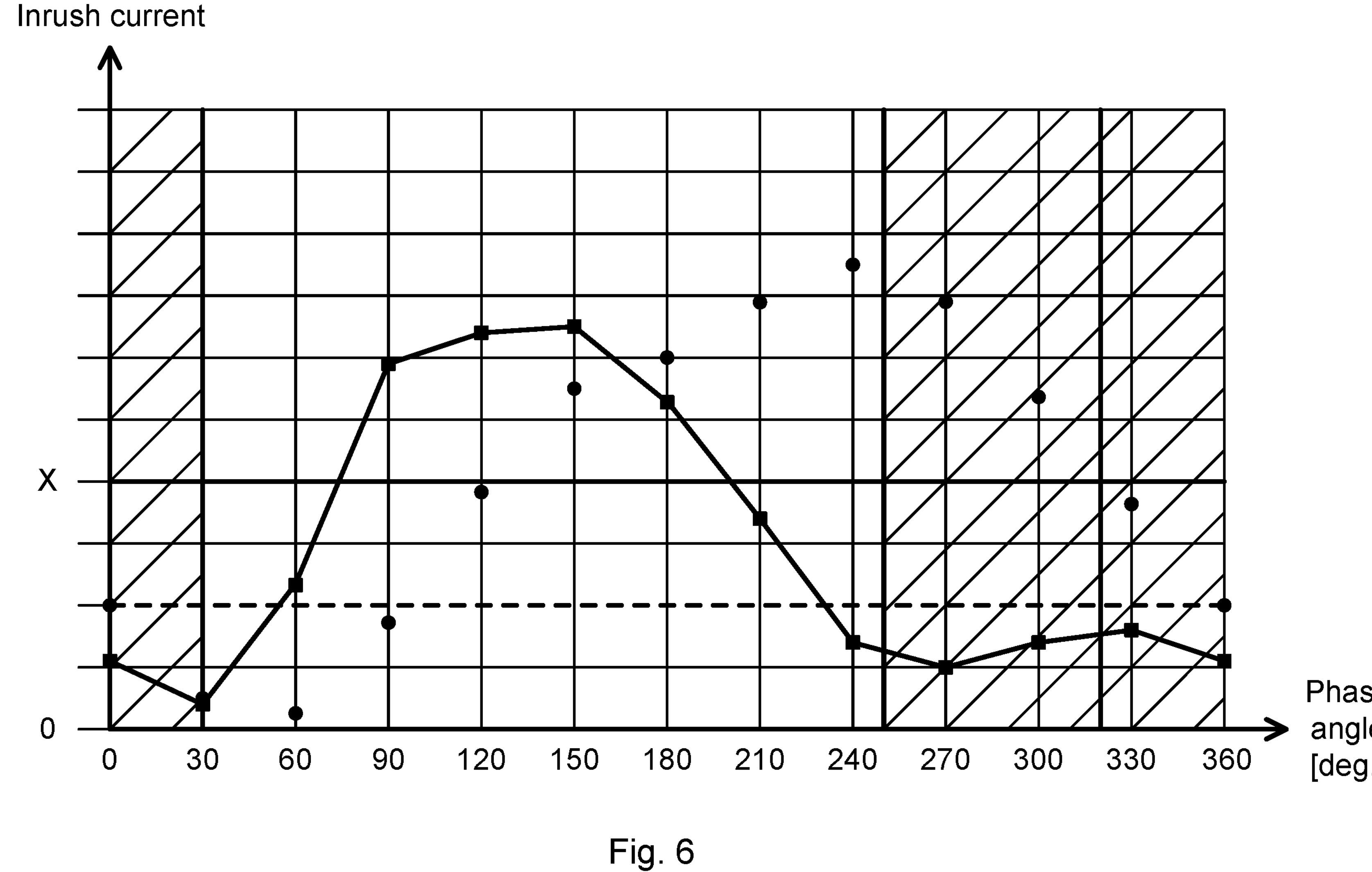
FIG. 6: is a graph of inrush current as a function of closing phase angles of the phase to ground voltage of a reference phase.

FIG. 6 is a graph of inrush currents as a function of closing phase angles of the phase to ground voltage Vpg of a reference phase L1-L3 for one example implementation of the power system 16. FIG. 6 also shows one example of an acceptable limit value X of the inrush current. The acceptable limit value X may correspond to a peak value of a nominal current of the transformer 26. In FIG. 6, the reference phase (here L1) has been opened in step a) such that a reference current (here 11) was interrupted at a first positive current zero crossing 32 after the opening.

In FIG. 6, the circles show the inrush currents for simultaneous closing of all phases L1-L3 at different closing phase angles according to a comparative example. The squares show the inrush currents for simultaneous closing of only the reference phase and the phase lagging the reference phase by 120° at respective closing phase angles, where the phase lagging the reference phase by 240° is closed a quarter period 30 later, according to the invention. The squares thus represent a non-simultaneous closing of all phases L1-L3 according to the invention.

If, after performance of steps a) and b), all phases L1-L3 are closed simultaneously at a closing phase angle of 320° of the phase to ground voltage Vpg of the reference phase (here L1), the inrush current is approximately 105% of the acceptable limit value X. If the reference phase (here L1) and the phase (here L2) lagging the reference phase by 120° are closed simultaneously in step c) at a closing phase angle of 320° and the phase (here L3) lagging the reference phase by 240° is closed at a closing phase angle of 50° (a quarter period 30 after step c)), the inrush current is approximately 37.5% of the acceptable limit value X. As can be seen in FIG. 6, a simultaneous closing of all phases L1-L3 gives a minimum inrush current around closing phase angles of 30° to 60°.

For example, in order to keep the inrush current below the acceptable limit value X, the simultaneous closing of all phases L1-L3 (represented by the circles) has to occur at closing phase angles approximately in the ranges of 0° to 123° and 324° to 360°, i.e., a total range or window of 159°. For the same nominal value of inrush current, the non-simultaneous closing of all phases L1-L3 according to the invention (represented by the squares) can occur at closing phase angles in step c) approximately in the ranges of 0° to 74° and 201° to 360°, i.e., a total range or window of 233°.

According to a further example, in order to keep the inrush current below 50% of the acceptable limit value X (below the dashed line in FIG. 6), the simultaneous closing of all phases L1-L3 (represented by the circles) has to occur at closing phase angles approximately in the range of 0° to 94°. For the same nominal value of inrush current, the non-simultaneous closing of all phases L1-L3 according to the invention (represented by the squares) can occur at closing phase angles in step c) approximately in the ranges of 0° to 55° and 231° to 360°, i.e., a total range or window of 184°.

The method may comprise aiming at a centre of the respective window, i.e., at a closing phase angle of 317° for the example of an inrush current below the acceptable limit value X, and at a closing phase angle of 323° for the example of an inrush current below 50% of the acceptable limit value X. In step c) of the method, the closing of the reference phase (here L1) and the phase (here L2) lagging the reference phase by 120° are closed in a window centered at a closing phase angle of 320° for a positive phase sequence. For a negative phase sequence, the window is centered at a closing phase angle of 140°.

Thus, for a nominal maximum value of inrush currents, the method according to the invention increases the ranges of feasible closing phase angles in comparison with the simultaneous closing of all phases L1-L3. Precision requirements on hardware of or associated with the power system 16, such as the servomotors 20*a*-20*c* and the poles 24*a*-24*c*, can therefore be relaxed without deteriorating functionality. Moreover, larger variations of grid layout, cable lengths etc. can be handled by the same settings of the power system 16. This increases cost-efficiency of the power system 16.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A method of performing a circuit opening and closing operation in a power system having a first phase, a second phase lagging the first phase by 120°, and a third phase lagging the first phase by 240°, the method comprising:

a) opening only a reference phase among the first phase, the second phase and the third phase such that a reference current of the reference phase is interrupted at a first current zero crossing after the opening;

b) opening the remaining phases of the first phase, the second phase and the third phase after step a);

c) closing only the reference phase and a phase among the first phase, the second phase and the third phase lagging the reference phase by 120° simultaneously or essentially simultaneously at a closing phase angle of a phase to ground voltage of the reference phase of 320°±70° when the current zero crossing is a positive current zero crossing, or of 140°±70° when the current zero crossing is a negative current zero crossing; and d) closing the phase lagging the reference phase by 240° after step c).

2. The method as claimed in claim 1, wherein in step c), the closing phase angle is 320°±40° when the current zero crossing is a positive current zero crossing, or 140°±40° when the current zero crossing is a negative current zero crossing.

3. The method as claimed in claim 1, wherein in step c), the closing phase angle is 320°±20° when the current zero crossing is a positive current zero crossing, or 140°±20° when the current zero crossing is a negative current zero crossing.

4. The method as claimed in claim 1, wherein in step b) the remaining phases are opened simultaneously or essentially simultaneously.

5. The method as claimed in claim 1, wherein in step b) the remaining phases are opened in a time range from 60° to 120° after the opening of the reference phase in step a).

6. The method as claimed in claim 1, wherein in step b) the remaining phases are opened a quarter of a period after the opening of the reference phase in step a).

7. The method as claimed in claim 1, wherein in step d) the phase lagging the reference phase by 240° is closed in a time range from 60° to 120° after step c).

8. The method as claimed in claim 1, wherein in step d) the phase lagging the reference phase by 240° is closed a quarter of a period after step c).

9. The method as claimed in claim 1, comprising selecting the reference phase opened in step a) such that the first phase, the second phase and the third phase are opened first equally or about equally often over 100, 500 or 1000 circuit opening operations.

10. A computer program comprising computer code which when executed by processing circuitry of a control system causes the control system to command performance of a method of performing a circuit opening and closing operation in a power system having a first phase, a second phase lagging the first phase by 120°, and a third phase lagging the first phase by 240°, the method having the steps:

a) opening only a reference phase among the first phase, the second phase and the third phase such that a reference current of the reference phase is interrupted at a first current zero crossing after the opening;

b) opening the remaining phases of the first phase, the second phase and the third phase after step a);

c) closing only the reference phase and a phase among the first phase, the second phase and the third phase lagging the reference phase by 120° simultaneously or essentially simultaneously at a closing phase angle of a phase to ground voltage of the reference phase of 320°±70° when the current zero crossing is a positive current zero crossing, or of 140°±70° when the current zero crossing is a negative current zero crossing; and d) closing the phase lagging the reference phase by 240° after step c).

11. A control system for controlling a circuit breaker system connected to a three-phase power source having a first phase, a second phase lagging the first phase by 120°, and a third phase lagging the first phase by 240°, wherein the control system comprises:

processing circuitry; and a storage medium having computer code which when executed by the processing circuitry causes the control system to perform a method of performing a circuit opening and closing operation in a power system having a first phase, a second phase lagging the first phase by 120°, and a third phase lagging the first phase by 240°, the method including the steps:

a) opening only a reference phase among the first phase, the second phase and the third phase such that a reference current of the reference phase is interrupted at a first current zero crossing after the opening;

b) opening the remaining phases of the first phase, the second phase and the third phase after step a);

c) closing only the reference phase and a phase among the first phase, the second phase and the third phase lagging the reference phase by 120° simultaneously or essentially simultaneously at a closing phase angle of a phase to ground voltage of the reference phase of 320°±70° when the current zero crossing is a positive current zero crossing, or of 140°±70° when the current zero crossing is a negative current zero crossing; and d) closing the phase lagging the reference phase by 240° after step c).

12. A power system comprising:

a control system for performing a circuit opening and closing operation in a power system having a first phase, a second phase lagging the first phase by 120°, and a third phase lagging the first phase by 240°, the method comprising:

a) opening only a reference phase among the first phase, the second phase and the third phase such that a reference current of the reference phase is interrupted at a first current zero crossing after the opening;

b) opening the remaining phases of the first phase, the second phase and the third phase after step a);

c) closing only the reference phase and a phase among the first phase, the second phase and the third phase lagging the reference phase by 120° simultaneously or essentially simultaneously at a closing phase angle of a phase to ground voltage of the reference phase of 320°±70° when the current zero crossing is a positive current zero crossing, or of 140°±70° when the current zero crossing is a negative current zero crossing; and d) closing the phase lagging the reference phase by 240° after step c);

a circuit breaker system having a first pole, a second pole and a third pole; and three actuating devices, each actuating device being configured to actuate a respective one of the first pole, the second pole and the third pole;

wherein the control system is configured to control the actuating devices.

13. The power system as claimed in claim 12, wherein the power system is an electric arc furnace circuit breaker system.

14. The method as claimed in claim 2, wherein in step c), the closing phase angle is 320°±20° when the current zero crossing is a positive current zero crossing, or 140°±20° when the current zero crossing is a negative current zero crossing.

15. The method as claimed in claim 2, wherein in step b) the remaining phases are opened simultaneously or essentially simultaneously.

16. The method as claimed in claim 2, wherein in step b) the remaining phases are opened in a time range from 60° to 120° after the opening of the reference phase in step a).

17. The method as claimed in claim 2, wherein in step b) the remaining phases are opened a quarter of a period after the opening of the reference phase in step a).

18. The method as claimed in claim 2, wherein in step d) the phase lagging the reference phase by 240° is closed in a time range from 60° to 120° after step c).

19. The method as claimed in claim 2, wherein in step d) the phase lagging the reference phase by 240° is closed a quarter of a period after step c).

20. The method as claimed in claim 2, comprising selecting the reference phase opened in step a) such that the first phase, the second phase and the third phase are opened first equally or about equally often over 100, 500 or 1000 circuit opening operations.

* * * * *